No. 740,907. PATENTED OCT. 6, 1903.
R. W. PAGE.
CONTROLLER FOR WEIGHT OPERATED MOTORS.
APPLICATION FILED JUNE 13, 1903.
NO MODEL. 2 SHEETS—SHEET 1.

WITNESSES.

INVENTOR.
Robert William Page

No. 740,907. PATENTED OCT. 6, 1903.
R. W. PAGE.
CONTROLLER FOR WEIGHT OPERATED MOTORS.
APPLICATION FILED JUNE 13, 1903.
NO MODEL. 2 SHEETS—SHEET 2.

WITNESSES.

INVENTOR
Robert William Page
by Foster, Freeman & Watson
Attorneys.

No. 740,907. Patented October 6, 1903.

UNITED STATES PATENT OFFICE.

ROBERT WILLIAM PAGE, OF LONDON, ENGLAND, ASSIGNOR TO R. BARRETT & SON, LIMITED, OF LONDON, ENGLAND, A CORPORATION OF GREAT BRITAIN.

CONTROLLER FOR WEIGHT-OPERATED MOTORS.

SPECIFICATION forming part of Letters Patent No. 740,907, dated October 6, 1903.

Application filed June 13, 1903. Serial No. 161,374. (No model.)

*To all whom it may concern:*

Be it known that I, ROBERT WILLIAM PAGE, a subject of His Majesty the King of Great Britain, residing at Barbican, London, England, have invented a certain new and useful Improved Controller for Weight-Operated Motors, of which the following is a specification.

This invention relates to a governing or controlling apparatus for regulating the running down of mechanism operated by the fall of a weight, the governing operation being effected by controlling the passage of water from one side of a piston to another through a valve operated by a cam by which the movement of such piston can be hastened or slowed during the course of its travel, so that more than one speed is given at times to the shaft which is being operated by the weight.

Figure 1:
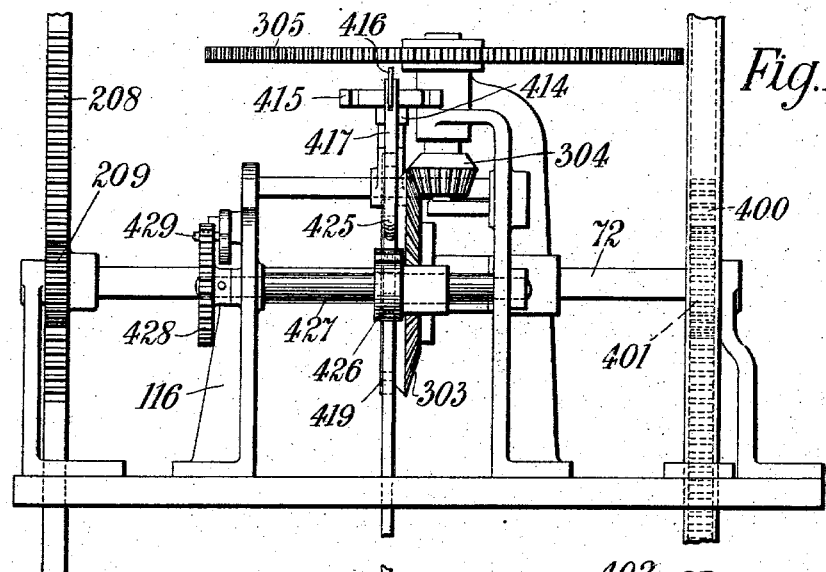
Figure 4:
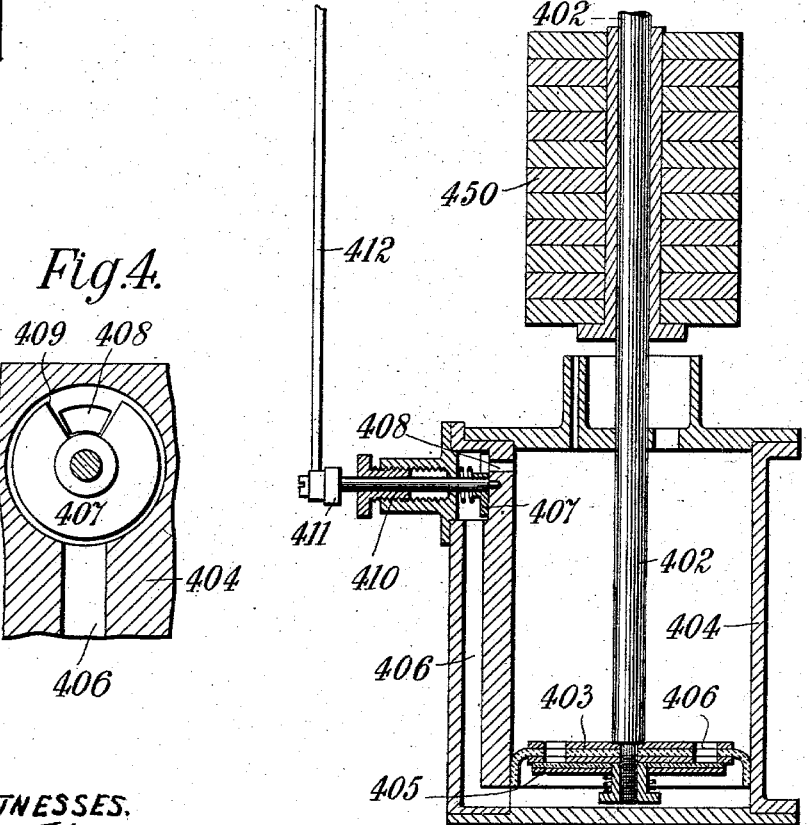
Figure 2:
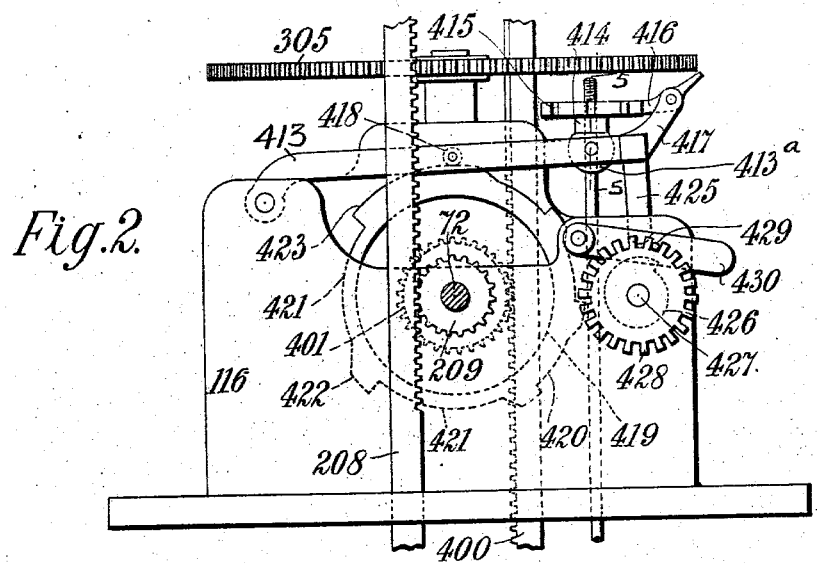
Figure 3:
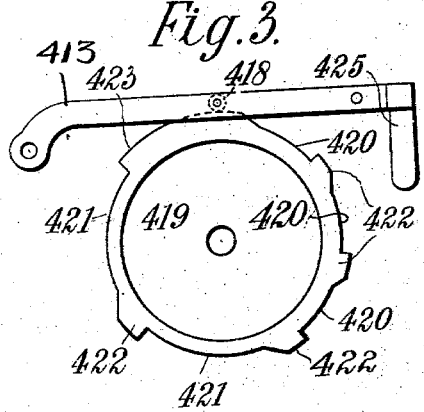
Figure 5:
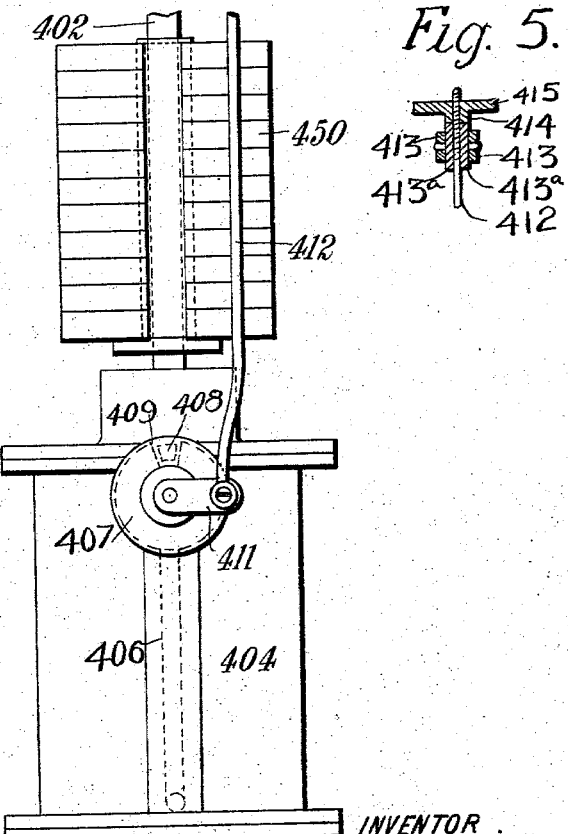

In the accompanying drawings, Figure 1 is a side elevation of the controlling apparatus, partly in section, showing a part of an apparatus it is intended to operate or control. Fig. 2 is an end view of same. Fig. 3 is a view showing a detail. Fig. 4 is a cross-section, on an enlarged scale, of the valve; and Fig. 5 is a cross-section on line 5 5 of Fig. 2.

In the arrangement shown the shaft 72 is the operating-shaft of any apparatus to be driven, such as an apparatus for taking and developing photographs automatically, and may carry among other parts, for instance, a bevel-gear 303, driving a gear 304 of a large spur-wheel 305, which communicates motion to certain parts; but the shaft may operate any suitable mechanism to which an intermittent motion or "dwell" of varying speeds is to be imparted.

On one end of the shaft 72 is a pinion 209, which is rotated by the movement of a rack 208, obtained from a pedal or in any other suitable way. At the other end of a shaft is a pinion 401, which operates a rack 400, which forms part of a piston-rod 402 of a piston 403, working in a cylinder 404, so that on the rotation of the shaft 72 by rack 208 the piston 403 can be raised.

The piston has a valve in it which will allow it to be drawn through the body of water or liquid in the cylinder when the piston is raised, but prevents its passing when the piston is being lowered by the weight. Such valve is shown as a spring-pressed disk 405, covering a number of perforations 406 in the piston. When the rack is released, the piston is forced down by a weight 450, carried on such rod, and the water beneath is forced through a passage 406 to the upper side of said piston through a valve which regulates its flow. This valve may be a disk 407, Fig. 4, rotated in front of an opening 408 in the wall of the cylinder, said disk having a slot 409 to correspond with opening 408. The disk forming the valve is pressed on its seat by a suitable spring and is operated by a rod 410, having an arm 411, to which is connected a rod 412, attached at its upper end to the free end of a lever 413, pivoted in the bracket 116. The rod 412 is held in the end of the lever by passing through a disk 413ª, pivoted between the two plates of which the lever is composed, so that it may rock slightly, said disk carrying a nut 414, capable of rotating thereon, and having a notched rim 415, with which a latch 416, pivoted in an extension 417 of the lever 413, can engage. By rotating this nut 414 the initial position of the valve can be adjusted so that the time which the liquid is to take to pass through can be first determined. When this is ascertained, the nut is held in the desired position by placing the latch 416 in one of the notches of the rim.

The lever 413 carries a roller 418, which rests on a cam 419 on shaft 72. This cam is a disk provided with a number of depressions 420 420 420 and 421 421, separated by raised surfaces 422 422 422 422 and 423. The depressions 421 are of greater circumferential length and also of greater depth than those marked 420, and the raised surface 423 is of greater circumferential length than the surfaces 422.

The lever 413 has an arm 425 adapted to bear on a snail or cam 426 on a short shaft 427, carried by the bracket 116, such shaft having at the front end a hand-wheel 428, which can be adjusted by the fingers and thumb, said wheel having a notched rim with which is adapted to engage a pin 429, carried by a latch 430, pivoted to the bracket 116, so that the wheel may be held in the position in which it may have been set. This wheel may be carried outside of the casing, if desired, so that the latter need not be opened to operate it.

The operation is as follows: Supposing the shaft 72 has been rotated to raise the weight and the cam 419 is in the position shown, the roller 418 being on the raised surface 423, as soon as the weight 450 commences to run down the shaft 72 will be rotated in the reverse direction, and the liquid beneath the piston will pass quickly to the other side through the valve, which by reason of the position of the rod 412 is then wide open. As soon, however, as the roller falls into the depression 421 the lever 413 and rod 412 will fall, closing or partially closing the valve and checking the passage of the liquid, so that the speed of rotation of the shaft 72 will be reduced and any part it operates correspondingly slowed. The lever 413 is controlled in its fall by the arm 425, which by resting upon the cam 426 determines the amount of fall, and hence the amount the valve will be closed. The moment, however, that the raised part 422 reaches the roller it quickly raises the lever and opens the valve, and as a result the piston travels very quickly for a short period, and shaft 72 also rotates quickly, these alterations of speed being repeated or obtained with each new surface of the cam into which the roller falls, the depth of such surface varying the position of the valve and the rate of rotation of the shaft.

It will be seen that when the roller falls into any of the depressions 420 (their depth being less than depressions 421) the arm 425 will not come into operation, as the roller 418 will rest and travel on the bottom of said depression. Thus the cam 426 serves to regulate the position of the valve at one time and the depressions 420 of the main cam at other times, according to the speeds required, the most open position of the valve being that when the roller is on the raised surfaces and the most closed position when it is in the depressions 421 and is controlled by the cam 426 and the intermediate position when it is traveling on the surfaces 420.

What I claim is—

1. The combination with a shaft, of means for rotating same in one direction, a weight, means for connecting the weight and shaft and driving the latter by the fall of the weight, a liquid control device, means for operating same by the weight, a valve comprising part of same, a cam carried by the shaft and means connecting said valve and cam, for operating the former whereby the movement of the liquid in the control device can be regulated.

2. The combination with a shaft, of means for rotating same in one direction, a weight, means for connecting the weight and shaft and driving the latter by the fall of the weight, a liquid control device, means for operating same by the weight, a valve comprising part of same, a cam carried by the shaft having depressions of varying depths and raised surfaces, a lever operated by said cam, and means connecting the lever and valve whereby the movement of the liquid in the control device can be regulated.

3. The combination with a shaft, of means for rotating same in one direction, a weight, means connecting the weight and shaft and driving the latter by the fall of the weight, a cylinder having a passage for liquid from one end to the other, a piston, means connecting the latter with the weight, a valve for said cylinder in said passage, a cam carried by the shaft having depressions of varying depths, a lever operated by said cam, and means connecting the lever and valve whereby the movement of the liquid in the control device can be regulated.

4. The combination with a shaft, of means for rotating same in one direction, a weight, means for connecting the weight and shaft and driving the latter by the fall of the weight, a liquid control device, means for operating same by the weight, a valve comprising part of same, a cam carried by the shaft, having depressions of varying depths, a lever operated thereby, a supplemental cam, means for altering the position of said supplemental cam, means carried by the lever adapted to bear on said cam whereby the position of said lever may be regulated, and means connecting the lever and valve whereby the movement of the control device can be regulated.

In testimony whereof I have hereunto set my hand in the presence of two subscribing witnesses.

ROBERT WILLIAM PAGE.

Witnesses:
   JOSEPH F. WRIGHT,
   PAUL DOWNES.